United States Patent
Kiessling et al.

(10) Patent No.: US 11,633,805 B2
(45) Date of Patent: Apr. 25, 2023

(54) ROTATING LIGHT SOURCE UTILIZED TO MODIFY SUBSTRATES

(71) Applicant: Corning Incorporated, Corning, NY (US)

(72) Inventors: Heiko Kiessling, Munich (DE); Florian Spaeth, Eching (DE); Ralf Joachim Terbrueggen, Neuried (DE)

(73) Assignee: Corning Incorporated, Corning, NY (US)

( * ) Notice: Subject to any disclaimer, the term of this patent is extended or adjusted under 35 U.S.C. 154(b) by 633 days.

(21) Appl. No.: 16/583,733

(22) Filed: Sep. 26, 2019

(65) Prior Publication Data
US 2020/0101562 A1    Apr. 2, 2020

Related U.S. Application Data

(60) Provisional application No. 62/738,643, filed on Sep. 28, 2018.

(51) Int. Cl.
*B23K 26/10*    (2006.01)
*B23K 26/06*    (2014.01)
*C03B 33/10*    (2006.01)
*B23K 103/00*   (2006.01)

(52) U.S. Cl.
CPC ........ *B23K 26/103* (2013.01); *B23K 26/0648* (2013.01); *C03B 33/102* (2013.01); *B23K 2103/54* (2018.08)

(58) Field of Classification Search
CPC .... B23K 26/53; B23K 26/08; B23K 26/0617; B23K 26/0648; B23K 26/006
See application file for complete search history.

(56) References Cited

U.S. PATENT DOCUMENTS

| | | | |
|---|---|---|---|
| 5,877,960 | A | 3/1999 | Gross et al. |
| 6,064,033 | A | 5/2000 | Carbonato et al. |
| 7,015,418 | B2 | 3/2006 | Cahill et al. |
| 7,482,776 | B2 | 1/2009 | Scholich-Tessmann |
| 9,815,730 | B2 | 11/2017 | Marjanovic et al. |

(Continued)

FOREIGN PATENT DOCUMENTS

| | | |
|---|---|---|
| CN | 1154283 A | 7/1997 |
| CN | 103639599 A | 3/2014 |

(Continued)

OTHER PUBLICATIONS

International Search Report and Written Opinion of the International Searching Authority; PCT/US2019/052082; dated Aug. 20, 2020; 15 Pages; European Patent Office.

(Continued)

*Primary Examiner* — Thien S Tran
(74) *Attorney, Agent, or Firm* — Amy T. Lang; John P. McGroarty

(57) ABSTRACT

A system comprising a beam source (110) and an optical system (304) comprising first and second portions. The system further comprises first and second torque motors integrated into respective ones of the first and second portions, The first torque motor (420) is configured to rotate first portion (416) around a first axis (434). The second torque motor (426) is configured to rotate second portion (418) around a second axis (436). The first axis is perpendicular to the second axis.

23 Claims, 12 Drawing Sheets

(56) References Cited

U.S. PATENT DOCUMENTS

| | | |
|---|---|---|
| 9,850,159 B2 | 12/2017 | Bhuyan et al. |
| 2006/0202115 A1 | 9/2006 | Lizotte et al. |
| 2007/0020785 A1 | 1/2007 | Bruland et al. |
| 2011/0255157 A1 * | 10/2011 | Murayama ......... G02B 21/0072 359/385 |
| 2014/0199519 A1 | 7/2014 | Schillinger et al. |
| 2017/0252859 A1 * | 9/2017 | Kumkar ................ B23K 26/53 |
| 2017/0276951 A1 | 9/2017 | Kumkar et al. |
| 2018/0118603 A1 | 5/2018 | Nieber et al. |
| 2018/0148366 A1 | 5/2018 | Dawes et al. |
| 2019/0345056 A1 | 11/2019 | Cao et al. |

FOREIGN PATENT DOCUMENTS

| | | | |
|---|---|---|---|
| CN | 104241168 A | 12/2014 | |
| DE | 4205725 A1 * | 2/1992 | |
| DE | 202006015539 U1 | 2/2007 | |
| JP | 04-135087 A | 5/1992 | |
| JP | 2005288503 A | 10/2005 | |
| JP | 2009-082938 A | 4/2009 | |
| JP | 2017-049877 A | 3/2017 | |
| WO | 2009128219 A1 | 10/2009 | |
| WO | WO-2016079275 A1 * | 5/2016 | ........... B23K 26/042 |
| WO | 2018/064409 A1 | 4/2018 | |

OTHER PUBLICATIONS

Invitation to Pay Additional Fees and Partial Search Report of the European International Searching Authority; PCT/US2019/052082; dated Jan. 15, 2020; 12 Pgs.

Borghi et al; "M2 Factor of Bessel-Gauss Beams"; Optics Letters, vol. 22, No. 5, (1997); pp. 262-264.

Siegman; "New Developments in Laser Resonators"; Proc. SPIE 1224, Optical Resonators (1990); 14 Pages.

Japanese Patent Application No. 2021-517571, Office Action, dated May 11, 2022,13 pages (07 pages of English Translation and 06 pages of Original Copy); Japanese Patent Office.

Chinese Patent Application No. 201980076000.0, Office Action, dated Aug. 3, 2022, 32 pages, (17 pages of English Translation and 15 pages of Original Copy); Chinese Patent Office.

* cited by examiner

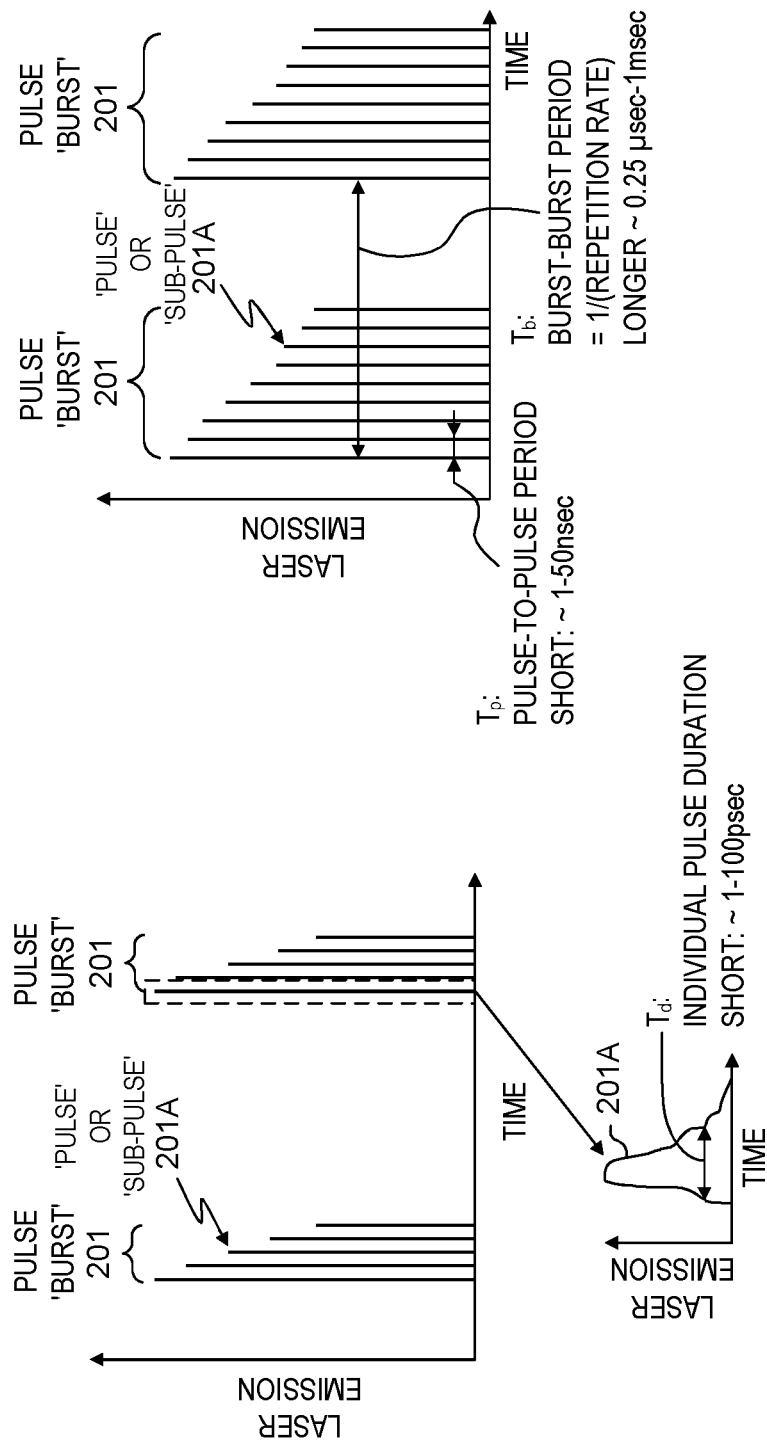

ROTATING LIGHT SOURCE UTILIZED TO MODIFY SUBSTRATES

This application claims the benefit of priority to U.S. Provisional Application Ser. No. 62/738,643 filed on Sep. 28, 2018, the content of which is relied upon and incorporated herein by reference in its entirety.

FIELD

The present specification generally relates to apparatuses and methods for laser processing transparent workpieces, and more particularly, to laser processing using a quasi-non-diffracting beam.

BACKGROUND

The area of laser processing of materials encompasses a wide variety of applications that involve cutting, drilling, milling, welding, melting, etc., of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives, there are many opportunities for improvement in cutting and separating glass substrates. It is of great interest to process a three-dimensional (3D) structure with curved surfaces. Typically the workpiece is tilted and directed towards the laser beam so that the beam incidence relative to the surface remains perpendicular. However these systems limiting productivity and size of the workpiece, and do not produce desired accuracy in most cases. Accordingly, a need exists for a system and method for free-form cutting transparent workpieces.

BRIEF SUMMARY

Therefore, what is needed is a high precision optical system that produces a desired laser beam and provides accurate positioning for free-form laser processing of a transparent workpiece.

According to a first embodiment, the present disclosure provides a system comprising a light source and an optical system comprising first and second portions. The system also comprises first and second torque motors integrated with respective ones of the first and second portions, wherein the first torque motor is configured to rotate the first portion around a first axis and the second torque motor is configured to rotate the second portion around a second axis, wherein the first axis is perpendicular to the second axis.

A second embodiment includes the system of the first embodiment, wherein the optical system comprises an aspheric optical element, a first reflecting optical device, a first lens that configured to collimate the light, a second reflecting optical device, and a second lens that configured to focus the light.

A third embodiment includes the system of the first embodiment, wherein the optical system further comprises an aspheric optical element comprising a refractive axicon, a reflective axicon, a negative axicon, a spatial light modulator, a diffractive optic, or a cubically shaped optical element.

A fourth embodiment includes the system of the first or second embodiment, wherein the optical system comprises first and second reflecting optical devices comprising mirrors.

A fifth embodiment includes the system of the first embodiment, wherein the first portion comprises an aspheric optical element and a reflecting optical device.

A sixth embodiment includes the system of the fifth embodiment, wherein the first portion further comprises a lens.

A seventh embodiment includes the system of the first embodiment, wherein the first portion comprises a reflecting optical device and a lens.

A eighth embodiment includes the system of the first embodiment, wherein the second portion comprises a reflecting optical device and a lens.

A ninth embodiment includes the system of the eighth embodiment, wherein the second portion further comprises another lens.

A tenth embodiment includes the system of the first embodiment, wherein the light source produces pulsed laser beam with pulse bursts comprising two sub-pulses per pulse burst or more.

A eleventh embodiment includes any of the previous embodiments, wherein the optical system is configured to generate a quasi-non-diffracting beam.

A twelfth embodiment includes any of the previous embodiments, wherein the quasi-non-diffracting beam comprises a wavelength $\lambda$, a spot size $w_o$, and a cross section that comprises a Rayleigh range $Z_R$ that is greater than $$F_D \frac{\pi w_0^2}{\lambda}$$

where $F_D$ is a dimensionless divergence factor comprising a value of 10 or greater.

A thirteenth embodiment includes the system of the twelfth embodiment, wherein the dimensionless divergence factor $F_D$ comprises a value of from 10 to 2000, from 50 to 1500, or from 100 to 1000.

A fourteenth embodiment includes any of the previous embodiments, further comprising an encoder configured to track the torque motor.

A fifteenth embodiment includes any of the previous embodiments, wherein the first axis is vertical Z axis and the second axis is X or Y axis in a Cartesian coordinate system.

A sixteenth embodiment includes any of the previous embodiments, wherein the system is configured for laser processing a transparent workpiece.

A seventeenth embodiment includes the system of the sixteenth embodiment, wherein the transparent workpiece comprises an alkali aluminosilicate glass material.

According to an eighteenth embodiment, a method comprising generating, by a system, a quasi-non-diffracting beam and directing the quasi-non-diffracting beam onto a transparent workpiece. The method also comprises generating an induced absorption and producing a defect within the transparent workpiece. The method further comprises moving, by an optical system, the quasi-non-diffracting beam relative to the transparent workpiece along a contour line and forming a contour with a plurality of defects in the transparent workpiece, wherein the quasi-non-diffracting beam is oriented orthogonal to an impingement surface of the transparent workpiece at an impingement location.

A nineteenth embodiment includes the method of the eighteenth embodiment, wherein the impingement surface of the transparent workpiece is a curved surface.

A twentieth embodiment includes the method of the eighteenth or nineteenth embodiment, further comprising an orthogonal orientation between the quasi-non-diffraction beam and the impingement surface, maintained as the quasi-non-diffraction beam moving along the contour lines to different locations on a curved surface of the transparent workpiece that have different surface orientations.

A twenty-first embodiment includes the method of the eighteenth, nineteenth or twentieth embodiment, wherein the system comprising a light source, an optical system that comprising first and second portions, and first and second torque motors integrated with respective ones of the first and second portions, wherein the first torque motor is configured to rotate the first portion around a first axis and the second torque motor is configured to rotate the second portion around a second axis, wherein the first axis is perpendicular to the second axis.

A twenty-second embodiment includes the method of the twenty-first embodiment, wherein the optical system comprises an aspheric optical element, a first reflecting optical device, a first lens that configured to collimate the light, a second reflecting optical device, and a second lens that configured to focus the light.

According to a twenty-third embodiment, a method comprising capturing images of contours of an object, determining motion of a quasi-non-diffracting beam from displacements of a calibration pattern in the captured images, comparing the determined displacements with predetermined displacements, producing a difference value from the comparing, correcting the positions and orientations of the quasi-non-diffracting beam according to the difference value, and repeating the capturing, determining, comparing, producing and correcting until the difference value is below a threshold value.

A twenty-fourth embodiment includes the method of the twenty-third embodiment, wherein the threshold value comprises a value between 20 μm to 40 μm.

A twenty-fifth embodiment includes the method of the twenty-third or twenty-fourth embodiment, further comprising using an alkali aluminosilicate glass material as the object.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS/FIGURES

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1A schematically depicts the formation of a contour of defects in a transparent workpiece according to one or more embodiments described herein;

FIG. 1B schematically depicts the positioning of a laser beam focal line during processing of a transparent workpiece, according to one or more embodiments described herein;

FIG. 1C schematically depicts an optical assembly for laser processing, according to one or more embodiments described herein;

FIG. 2A graphically depicts the relative intensity of laser pulses within an exemplary pulse burst vs. time, according to one or more embodiments described herein;

FIG. 2B graphically depicts relative intensity of laser pulses vs. time within another exemplary pulse burst, according to one or more embodiments described herein;

Figure 1A:
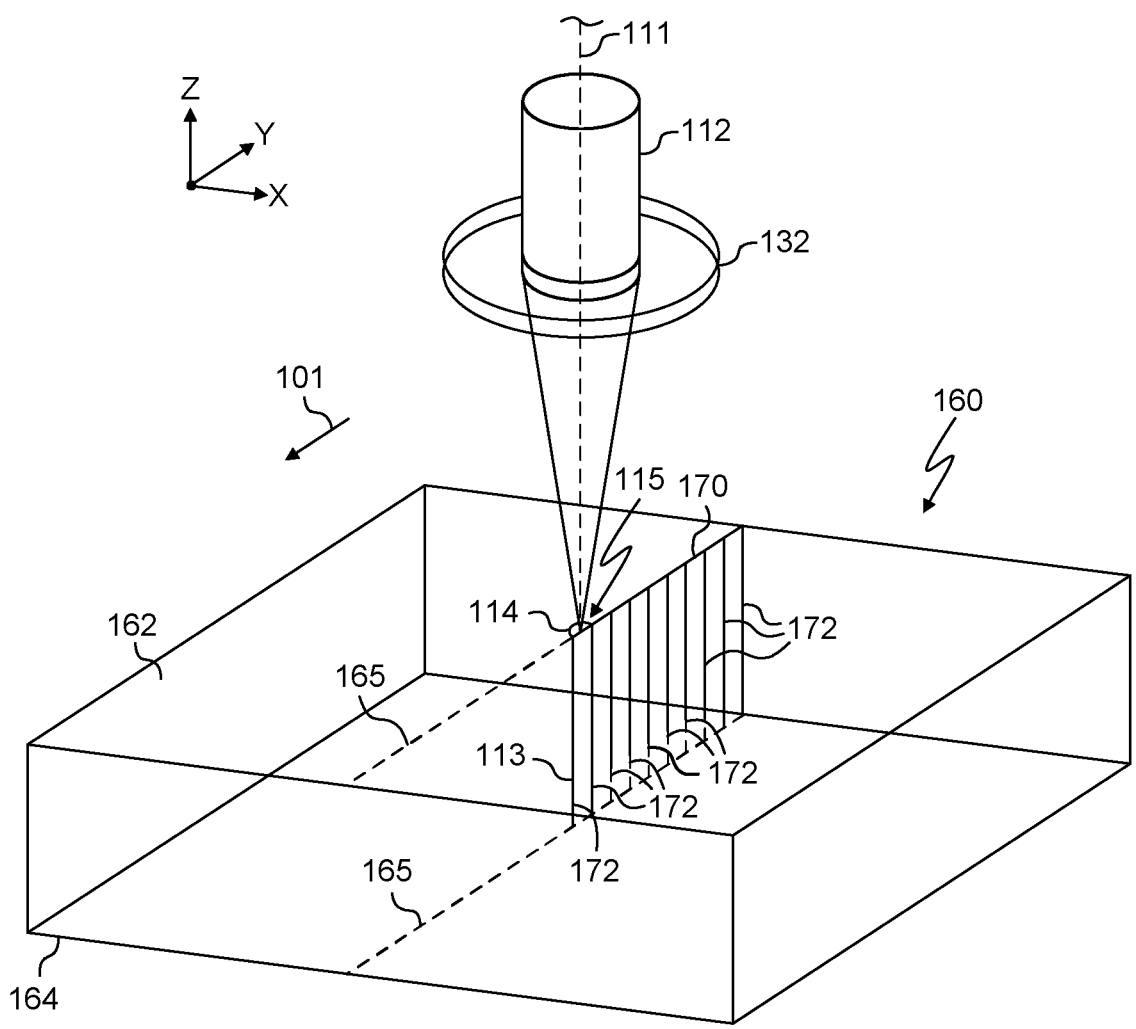

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Reference will now be made in detail to embodiments of a system and processes for laser processing transparent workpieces with rotating light source, examples of which are illustrated in the accompanying drawings. Whenever possible, the same reference numerals will be used throughout the drawings to refer to the same or like parts.

As used herein, "laser processing" comprises directing a laser beam onto and/or into a transparent workpiece. In some embodiments, laser processing further comprises translating the laser beam relative to the transparent workpiece, for example, along a contour line, along a modification line, or along another pathway. Examples of laser processing include using a laser beam to form a contour comprising a series of defects that extend into the transparent workpiece, using a laser beam to form a modification track in the transparent workpiece, and using an infrared laser beam to heat the transparent workpieces of the laminate workpiece stack. Laser processing may separate the transparent workpiece along one or more desired lines of separation. However, in some embodiments, additional, non-laser steps may be utilized to separate the transparent workpieces along one or more desired lines of separation.

As used herein, "contour line," denotes a linear, angled, polygonal or curved line on a surface of a transparent workpiece that defines the path traversed by the laser beam as it is moved within the plane of the workpiece to create a corresponding contour.

As used herein, "contour," refers to a set of defects in a workpiece formed by translating a laser along a contour line. As used herein, a contour refers to a virtual two dimensional shape or path in or on a substrate. Thus, while a contour itself is a virtual shape, the contour may be manifest, for example, by a fault line or a crack. A contour defines a surface of desired separation in the workpiece. A contour may be formed by creating a plurality of defects in the transparent workpiece using various techniques along the contour line, for example by directed a pulsed laser beam at successive points along the contour line. Multiple contours and/or lasers with curved focal lines may be used to create complex shapes, such as a beveled surface of separation.

As used herein, a "fault line" refers to a series of closely spaced defect lines extending along and approximating a contour.

As used herein, a "defect" refers to a region of modified material (e.g., a region of modified refractive index relative to the bulk material), void space, crack, scratch, flaw, hole, perforation or other deformities in the transparent workpiece. These defects may be referred to, in various embodiments herein, as defect lines or damage tracks. A defect line or damage track is formed by a laser beam directed onto a single position of the transparent workpiece, for a single laser pulse or multiple pulses at the same location. Translating the laser along the contour line results in multiple defect lines that form a contour. For a line focus laser, the defect may have a linear shape.

As used herein, the phrase "beam cross section" refers to the cross section of a laser beam along a plane perpendicular to a beam propagation direction of the laser beam, for example, along an X-Y plane when the beam propagation direction is in a Z direction.

As used herein, "beam spot" refers to a cross section of a laser beam (e.g., a beam cross section) in the impingement surface, i.e., the surface of a transparent workpiece in closest proximity to the laser optics.

As used herein, "impingement surface" refers to the surface of a transparent workpiece in closest proximity to the laser optics.

As used herein, "upstream" and "downstream" refer to the relative position of two locations or components along a beam pathway with respect to a beam source. For example, a first component is upstream from a second component if the first component is closer to the laser optics along the path traversed by the laser beam than the second component.

As used herein, "laser beam focal line," refers to pattern of interacting (e.g., crossing) light rays of a laser beam that form a linear, elongated focused region, parallel to an optical axis. The laser beam focal line comprises aberrated light rays that interact (e.g., cross) an optical axis of the laser beam at different positions along the optical axis. Furthermore, the laser beam focal lines described herein are formed using a quasi-non-diffracting beam, mathematically defined in detail below.

As used herein, a "caustic" refers to an envelope of light of a laser beam refracted by an optical component and thereafter directed onto and/or a transparent workpiece. For example, the caustic may comprise the envelope of light of a laser beam extending from the most downstream optical component of an optical system onto and/or into a transparent workpiece. Moreover, wavefronts of the caustic may interact (e.g., cross) to form a laser beam focal line, for example, within a transparent workpiece.

As used herein, the "optically modified region," is a region formed in the transparent workpiece or a material disposed on the transparent workpiece comprising optical properties sufficient to modify the portion of the caustic that impinges, and in some embodiments, traverses, the optically modifies region. Example optical properties of the optically modified region include, blocking properties, scattering properties, reflecting properties, absorption properties, refractive properties, diffracting properties, phase altering properties, or the like. Example optically modified regions described herein include a modification track and a disruptive material strip.

As used herein, a portion of a caustic is "modified" by an optically modified region when the optically modified region alters the wavefronts of a caustic in a manner that reduces the intensity of or prevent the formation of a laser beam focal line along the path of the wavefront in the portion of a caustic to the point where a defect is not formed in a place where it would have formed in the absence of the optically modified region. Example modifications of wavefronts of the caustic may comprise blocking, absorbing, refracting, diffracting, reflecting, scattering, or phase altering the wavefronts.

The phrase "transparent workpiece," as used herein, means a workpiece formed from glass, glass-ceramic or other material which is transparent, where the term "transparent," as used herein, means that the material has an optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has an optical absorption of less than about 20% per mm of material depth, The transparent workpiece may have a depth (e.g., thickness) of from about 50 microns (μm) to about 10 mm (such as from about 100 μm to about 5 mm, or from about 0.5 mm to about 3 mm. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components which are transparent to the wavelength of the laser, for example, crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+ (when present in the glass), Na+, K+, Rb+, and Cs+. Alternatively, monovalent cations in the surface layer may be replaced with monovalent cations other than alkali metal cations, such as Ag+, Tl+, Cu+, or the like.

Figure 1B:
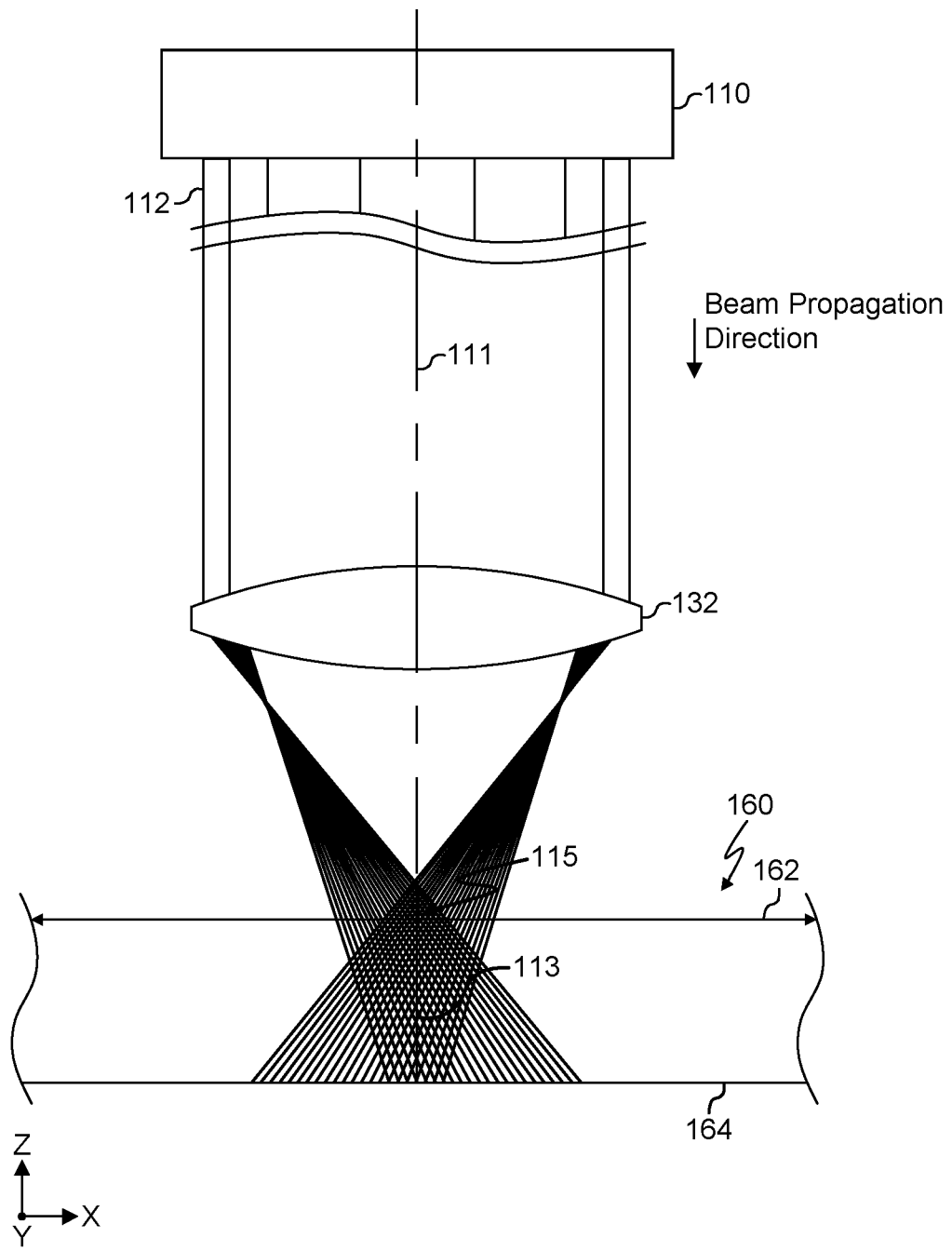

Referring now to FIGS. 1A and 1B, an exemplary transparent workpiece 160 (also referred to "substrate") is schematically depicted undergoing laser processing according to the methods described herein. In particular, FIG. 1A schematically depicts the formation of a contour 170 comprising a plurality of defects 172, which may be used to separate the transparent workpieces 160. The contour 170 comprising the plurality of defects 172 may be formed by processing the transparent workpiece 160 with a laser beam 112, which may comprise an ultra-short pulsed laser beam moving in a translation direction 101 along a contour line 165. The defects 172 may extend, for example, through the depth of the transparent workpiece 160, and may be orthogonal to an impingement surface of the transparent workpiece 160. Further, the laser beam 112 initially contacts the transparent workpiece 160 at an impingement location 115, which is a specific location on the impingement surface. As depicted in FIGS. 1A and 1B, a first surface 162 of the transparent workpiece 160 comprises the impingement surface, however, it should be understood that in other embodiments, the laser beam 112 may instead initially irradiate a second surface 164 of the transparent workpiece 160. Furthermore, FIG. 1A depicts that the laser beam 112 forms a beam spot 114 projected onto the first surface 162 of the transparent workpiece 160.

U.S. Pat. No. 9,815,730, filed Oct. 31, 2014, which is incorporated by reference in its entirety, describes methods for processing a 3D shaped transparent substrate using lasers.

FIGS. 1A and 1B depict the laser beam 112 propagating along a beam pathway 111 and oriented such that the laser beam 112 may be focused into a laser beam focal line 113 within the transparent workpiece 160, for example, using an aspheric optical element 120 (FIG. 1C), for example, an axicon and one or more lenses (e.g., a first lens 130 and a second lens 132, as described below and depicted in FIG. 1C). For example, the position of the laser beam focal line 113 may be controlled along the Z-axis and about the Z-axis. Further, the laser beam focal line 113 may have a length in a range of from about 0.1 mm to about 100 mm or in a range of from about 0.1 mm to about 10 mm. Various embodiments may be configured to have a laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. Further, the laser beam focal line 113 may be a portion of a quasi-non-diffracting beam, as defined in more detail below.

In operation, the laser beam 112 may be translated relative to the transparent workpiece 160 (e.g., in the translation direction 101) along the contour line 165 to form the plurality of defects 172 of the contour 170. Directing or localizing the laser beam 112 into the transparent workpiece 160 generates an induced absorption within the transparent workpiece 160 and deposits enough energy to break chemical bonds in the transparent workpiece 160 at spaced locations along the contour line 165 to form the defects 172. According to one or more embodiments, the laser beam 112 may be translated across the transparent workpiece 160 by motion of the transparent workpiece 160 (e.g., motion of a translation stage 190 coupled to the transparent workpiece 160, as shown in FIG. 1C), motion of the laser beam 112 (e.g., motion of the laser beam focal line 113), or motion of both the transparent workpiece 160 and the laser beam focal line 113. By translating the laser beam focal line 113 relative to the transparent workpiece 160, the plurality of defects 172 may be formed in the transparent workpiece 160.

In some embodiments, the defects 172 may generally be spaced apart from one another by a distance along the contour 170 of from about 0.1 μm to about 500 μm, for example, about 1 μm to about 200 μm, about 2 μm to about 100 μm, about 5 μm to about 20 μm, or the like. For example, suitable spacing between the defects 172 may be from about 0.1 μm to about 50 μm, such as from about 5 μm to about 15 μm, from about 5 μm to about 12 μm, from about 7 μm to about 15 μm, or from about 7 μm to about 12 μm for the TFT/display glass compositions. In some embodiments, a spacing between adjacent defects 172 may be about 50 μm or less, 45 μm or less, 40 μm or less, 35 μm or less, 30 μm or less, 25 μm or less, 20 μm or less, 15 μm or less, 10 μm or less, or the like.

As illustrated in FIG. 1A, the plurality of defects 172 of the contour 170 extend into the transparent workpiece 160 and establish a path for crack propagation for separation of the transparent workpiece 160 into separate portions along the contour 170. Forming the contour 170 comprises translating the laser beam 112 relative to the transparent workpiece 160 (e.g., in the translation direction 101) along the contour line 165 to form the plurality of defects 172 of the contour 170. According to one or more embodiments, the laser beam 112 may be translated across the transparent workpiece 160 by motion of the transparent workpiece 160, motion of the laser beam 112 (e.g., motion of the laser beam focal line 113), or motion of both the transparent workpiece 160 and the laser beam 112, for example, using one or more translation stages 190 (FIG. 1C). By translating the laser beam focal line 113 relative to the transparent workpiece 160, the plurality of defects 172 may be formed in the transparent workpiece 160. Moreover, while the contour 170 illustrated in FIG. 1A is linear, the contour 170 may also be nonlinear (i.e., having a curvature). Curved contours may be produced, for example, by translating either the transparent workpiece 160 or laser beam focal line 113 with respect to the other in two dimensions instead of one dimension.

In some embodiments, the transparent workpiece 160 may be further acted upon in a subsequent separating step to induce separation of the transparent workpiece 160 along the contour 170. The subsequent separating step may include using mechanical force or thermal stress induced force to propagate a crack along the contour 170. The thermal source, such as an infrared laser beam, may be used to create thermal stress and thereby separate the transparent workpiece 160 along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

Referring again to FIGS. 1A and 1B, the laser beam 112 used to form the defects 172 further has an intensity distribution I(X,Y,Z), where Z is the beam propagation direction of the laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the laser beam 112 in a cross-sectional plane may be referred to as a cross-sectional intensity distribution.

The laser beam 112 at the beam spot 114 or other cross sections may comprise a quasi-non-diffracting beam, for example, a beam having low beam divergence as mathematically defined below, by propagating the laser beam 112 (e.g., the laser beam 112, such as a Gaussian beam, using a beam source 110, such as a pulsed beam source) through an aspheric optical element 120, as described in more detail below with respect to the optical assembly 100 depicted in FIG. 1C. Beam divergence refers to the rate of enlargement of the beam cross section in the direction of beam propagation (i.e., the Z direction). One example beam cross section discussed herein is the beam spot 114 of the laser beam 112 projected onto the transparent workpiece 160. Example quasi-non-diffracting beams include Gauss-Bessel beams and Bessel beams.

Diffraction is one factor that leads to divergence of laser beams 112. Other factors include focusing or defocusing caused by the optical systems forming the laser beams 112 or refraction and scattering at interfaces. Laser beams 112 for forming the defects 172 of the contours 170 may form laser beam focal lines 113 with low divergence and weak diffraction. The divergence of the laser beam 112 is characterized by the Rayleigh range $Z_R$, which is related to the variance $\sigma^2$ of the intensity distribution and beam propagation factor $M^2$ of the laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the laser beam 112 having a time-averaged intensity profile I(x, y, z) are given by the following expressions:

$$\bar{x}(z) = \frac{\int_{-\infty}^{\infty}\int_{-\infty}^{\infty} x I(x, y, z) dx dy}{\int_{-\infty}^{\infty}\int_{-\infty}^{\infty} I(x, y, z) dx dy} \quad (1)$$

$$\bar{y}(z) = \frac{\int_{-\infty}^{\infty}\int_{-\infty}^{\infty} y I(x, y, z) dx dy}{\int_{-\infty}^{\infty}\int_{-\infty}^{\infty} I(x, y, z) dx dy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z) dx dy}{\int_{-\infty}^{\infty}\int_{-\infty}^{\infty} I(x, y, z) dx dy} \quad (3)$$

$$\sigma_{0y}^2(z) = \frac{\int_{-\infty}^{\infty}\int_{-\infty}^{\infty} y^2 I(x, y, z) dx dy}{\int_{-\infty}^{\infty}\int_{-\infty}^{\infty} I(x, y, z) dx dy} \quad (4)$$

$$\sigma_{\infty x}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (5)$$

$$\sigma_{\infty y}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2: 2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x, y, z)$ for an arbitrary optical beam (where $I(x, y, z) \equiv |\tilde{u}(x, y, z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z - z_{0x})^2 \quad (7)$$

$$\sigma_y^2(z) = \sigma_{0y}^2(z_{0y}) + \lambda^2 \sigma_{\infty y}^2 (z - z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the laser beam 112. Equations (7) and (8) indicate that $\sigma_x^2(z)$ and $\sigma_y^2(z)$ increase quadratically with z in either direction from the minimum values associated with the waist position of the laser beam 112 (e.g., the waist portion of the laser beam focal line 113). Further, in the embodiments described herein comprising a beam spot 114 that is axisymmetric and thereby comprises an axisymmetric intensity distribution I(x,y), $\sigma_x^2(z) = \sigma_y^2(z)$ and in the embodiments described herein comprising a beam spot 114 that is non-axisymmetric and thereby comprises a non-axisymmetric intensity distribution I(x,y), $\sigma_x^2(z) \neq \sigma_y^2(z)$, i.e., $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = \pi \sigma_{0x} \sigma_{\infty x} \quad (9)$$

$$M_y^2 = 4\pi \sigma_{0y} \sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z - z_{0x})^2 \quad (11)$$

$$\sigma_y^2(z) = \sigma_{0y}^2(z_{0y}) + \frac{\lambda^2 M_y^4}{(4\pi\sigma_{0y})^2}(z - z_{0y})^2 \quad (12)$$

which can be rewritten as:

$$\sigma_x^2(z) = \sigma_{0x}^2(z_{0x})\left[1 + \frac{(z - z_{0x})^2}{Z_{Rx}^2}\right] \quad (13)$$

$$\sigma_y^2(z) = \sigma_{0y}^2(z_{0y})\left[1 + \frac{(z - z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2 \lambda} \quad (15)$$

$$Z_{Ry} = \frac{4\pi\sigma_{0y}^2}{M_y^2 \lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx} = Z_{Ry}$, and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the TEM$_{00}$ mode of a Gaussian beam, the intensity profile is given by:

$$I(x, y) = \frac{\sqrt{\pi}}{2} w_o e^{\frac{-2(x^2+y^2)}{w_o^2}} \quad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2\lambda} = \frac{\pi w_0^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_0$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \quad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max}(\phi_{max,x}) = 2\sigma_{0y}(\phi_{max,y})$. The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like.

To promote uniformity of defects 172 in the beam propagation direction (e.g., depth dimension of the transparent workpiece 160), a laser beam 112 having low divergence may be used. In one or more embodiments, laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2\lambda} \quad (29)$$

$$Z_{Ry,min} = \frac{4\pi\sigma_{0,min}^2}{M_y^2\lambda} \quad (30)$$

Since divergence of the laser beam occurs over a shorter distance in the direction having the smallest Rayleigh range, the intensity distribution of the laser beam 112 used to form defects 172 may be controlled so that the minimum values of $Z_{Rx}$ and $Z_{Ry}$ (or for axisymmetric beams, the value of $Z_R$)

are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam 112 may be used with an intensity distribution that makes the smaller of $Z_{Rx,min}$ and $Z_{Ry,min}$ as large as possible when forming damage regions.

In some embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, in the range from 50 µm to 10 mm, in the range from 100 µm to 5 mm, in the range from 200 µm to 4 mm, in the range from 300 µm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In some embodiments, the spot size parameter $w_{o,min}$ is greater than or equal to 0.25 µm, greater than or equal to 0.50 µm, greater than or equal to 0.75 µm, greater than or equal to 1.0 µm, greater than or equal to 2.0 µm, greater than or equal to 3.0 µm, greater than or equal to 5.0 µm, in the range from 0.25 µm to 10 µm, in the range from 0.25 µm to 5.0 µm, in the range from 0.25 µm to 2.5 µm, in the range from 0.50 µm to 10 µm, in the range from 0.50 µm to 5.0 µm, in the range from 0.50 µm to 2.5 µm, in the range from 0.75 µm to 10 µm, in the range from 0.75 µm to 5.0 µm, in the range from 0.75 µm to 2.5 µm, or the like.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi-non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi-non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the laser beam 112 is considered quasi-non-diffracting if the characteristics of the laser beam satisfy Equation (31) or Equation (32) with a value of $F_D \geq 10$. As the value of $F_D$ increases, the laser beam 112 approaches a more nearly perfect non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams 112.

Figure 1C:
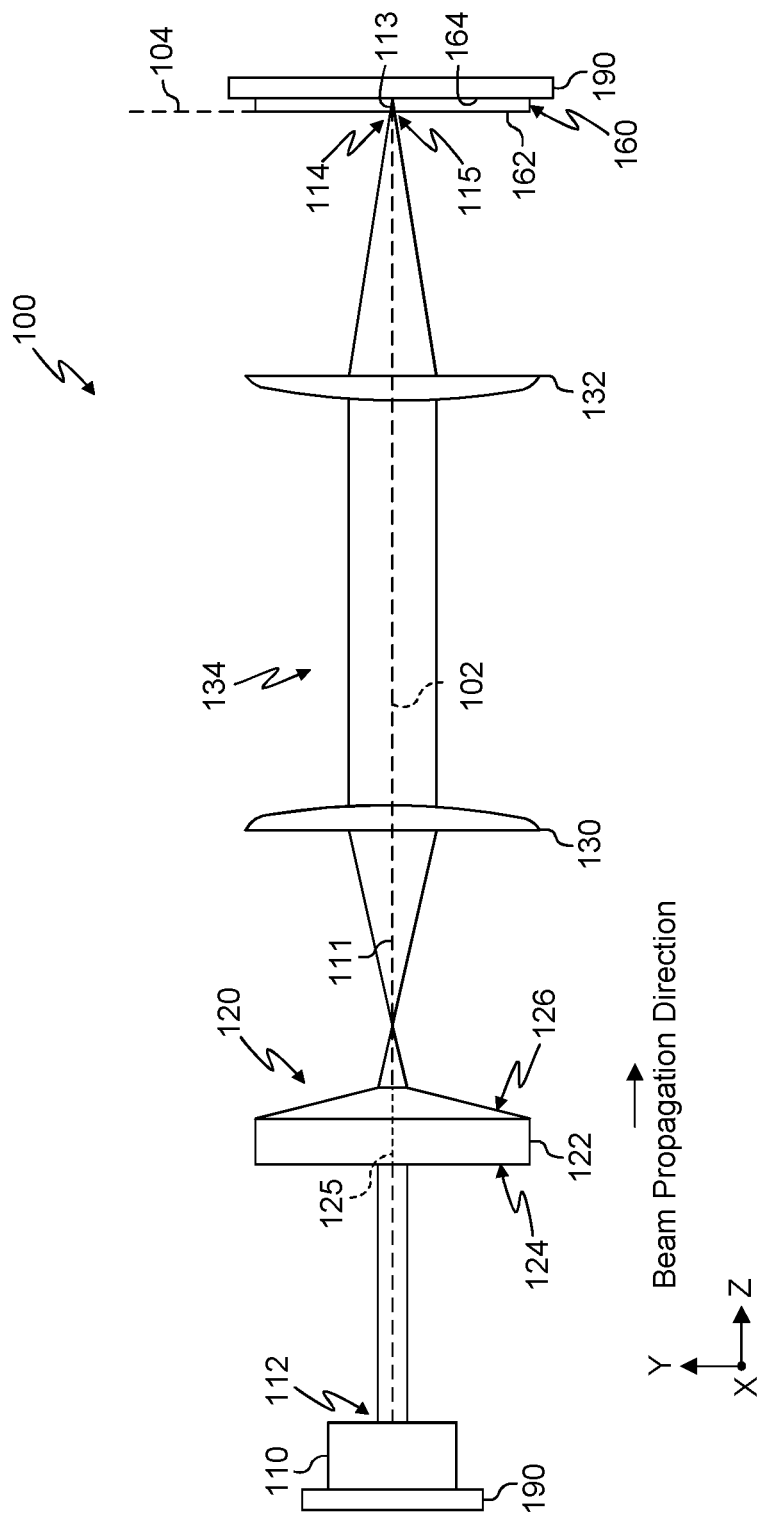

Referring now to FIG. 1C, an optical assembly 100 for producing a laser beam 112 that that is quasi-non-diffracting and forms the laser beam focal line 113 at the transparent workpiece 160 using the aspheric optical element 120 (e.g., an axicon 122) is schematically depicted. The optical assembly 100 includes a beam source 110 that outputs the laser beam 112, first lens 130 and second lens 132. The beam source 110 may comprise any known or yet to be developed beam source 110 configured to output laser beams 112, for example, pulsed laser beams or continuous wave laser beams. In some embodiments, the beam source 110 may output a laser beam 112 comprising a wavelength of for example, 1064 nm, 1030 nm, 532 nm, 530 nm, 355 nm, 343 nm, or 266 nm, or 215 nm. Further, the laser beam 112 used to form defects 172 in the transparent workpiece 160 may be well suited for materials that are transparent to the selected pulsed laser wavelength.

Further, the transparent workpiece 160 may be positioned such that the laser beam 112 output by the beam source 110 irradiates the transparent workpiece 160, for example, after traversing the aspheric optical element 120 and thereafter, both the first lens 130 and the second lens 132. An optical axis 102 extends between the beam source 110 and the transparent workpiece 160 (along the Z-axis in the embodiment depicted in FIG. 1C) such that when the beam source 110 outputs the laser beam 112, the beam pathway 111 of the laser beam 112 extends along the optical axis 102.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam 112 (e.g., the Z direction). Representative wavelengths for many glass workpieces include fundamental and harmonic wavelengths of $Nd^{3+}$ (e.g., $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 110 (e.g., a pulsed beam source such as an ultra-short pulse laser) in combination with the aspheric optical element 120, the first lens 130, and the second lens 132, to irradiate the transparent workpiece 160 and generate the laser beam focal line 113. The laser beam focal line 113 comprises a quasi-non-diffracting beam, such as a Gauss-Bessel beam or Bessel beam, as defined above, and may fully or partially perforate the transparent workpiece 160 to form defects 172 in the transparent workpiece 160, which may form the contour 170. In embodiments in which the laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 2A and 2B, in addition to a single pulse operation at the aforementioned individual pulse repetition rates, in embodiments comprising a pulsed laser beam, the pulses may be produced in pulse bursts 201 of two sub-pulses 201A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 201, or from 5 to 20 sub-pulses per pulse burst 201). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 μJ/burst and 2 sub-pulses, the 100 μJ/burst energy is split between the 2 pulses for an average energy of 50 μJ per sub-pulse and for a pulse burst having an energy of 100 μJ/burst and 10 sub-pulses, the 100 μJ/burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 2A and 2B, the sub-pulses 201A within the pulse burst 201 may be separated by a duration that is in a range from about 1 nsec to about 50 nsec, for example, from about 10 nsec to about 30 nsec, such as about 20 nsec. In other embodiments, the sub-pulses 201A within the pulse burst 201 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 2B) between adjacent sub-pulses 201A within a pulse burst 201 may be relatively uniform (e.g., within about 10% of one another). For example, in some embodiments, each sub-pulse 201A within a pulse burst 201 is separated in time from the subsequent sub-pulse by approximately 20 nsec (50 MHz). Further, the time between each pulse burst 201 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 2B) is about 5 microseconds for the beam source 110 outputting a laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 201 is a type of laser operation where the emission of sub-pulses 201A is not in a uniform and steady stream but rather in tight clusters of pulse bursts 201. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 μJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 201 where each pulse burst 201 contains a series of sub-pulses 201A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

While not intending to be limited by theory, the use of a laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIG. 1C, the aspheric optical element 120 is positioned within the beam pathway 111 between the beam source 110 and the transparent workpiece 160. In operation, propagating the laser beam 112, e.g., an incoming Gaussian beam, through the aspheric optical element 120 may alter the laser beam 112 such that the portion of the laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1r+a_2r^2+a_3r^3+a_4r^4+a_5r^5+a_6r^6+a_7r^7+a_8r^8+a_9r^9+a_{10}r^{10}+a_{11}r^{11}+a_{12}r^{12}$ where $z'$ is the surface sag of the aspheric surface, $r$ is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2$, $a_3$ ..., $a_{12}\neq0$). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 1C), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming laser beam 112 (e.g., an incoming Gaussian beam) into a quasi-non-diffracting beam, which, in turn, is directed through the first lens 130 and the second lens 132.

Referring still to FIG. 1C, the first lens 130 is positioned upstream the second lens 132 and may collimate the laser beam 112 within a collimation space 134 between the first lens 130 and the second lens 132. Further, the second lens 132 may focus the laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

For the applications using a quasi-non-diffracting beam, laser beam focal line 113 can be oriented perpendicular to first surface 162 of transparent workpiece 160 to maximize the average laser intensity along contour 170. Because of high aspect ratio of the Rayleigh range $Z_R$ and spot size $w_o$, the alignment of a quasi-non-diffracting beam can be more challenging. Deviation from normal incidence with a small angle (e.g., less than 20°) can result in significant decrease of laser intensity along contour 170, which can fall below the threshold for desired material modification and lose the cutting capability.

In some examples, normal incidence of a quasi-non-diffracting beam is achieved by rotating the substrate. In other examples, directly rotating the quasi-non-diffracting beam is strongly desirable for accurately cutting fine features on a three-dimensional (3D) substrate or cutting a substrate with large size. Because of preservation of beam shape, a Gaussian beam can be rotated or tilted through use of a swirling laser head. But rotating or tilting a quasi-non-diffracting beam is very difficult. When light propagation direction is manipulated outside the output of an optical system, particularly after quasi-non-diffracting beam formation, distortion of the beam shape can occur.

Embodiments discussed herein presents an optical system which integrates optical elements for quasi-non-diffracting beam formation with rotating mechanical units to provide precise positioning and controlled quasi-non-diffracting beam.

Figure 3:
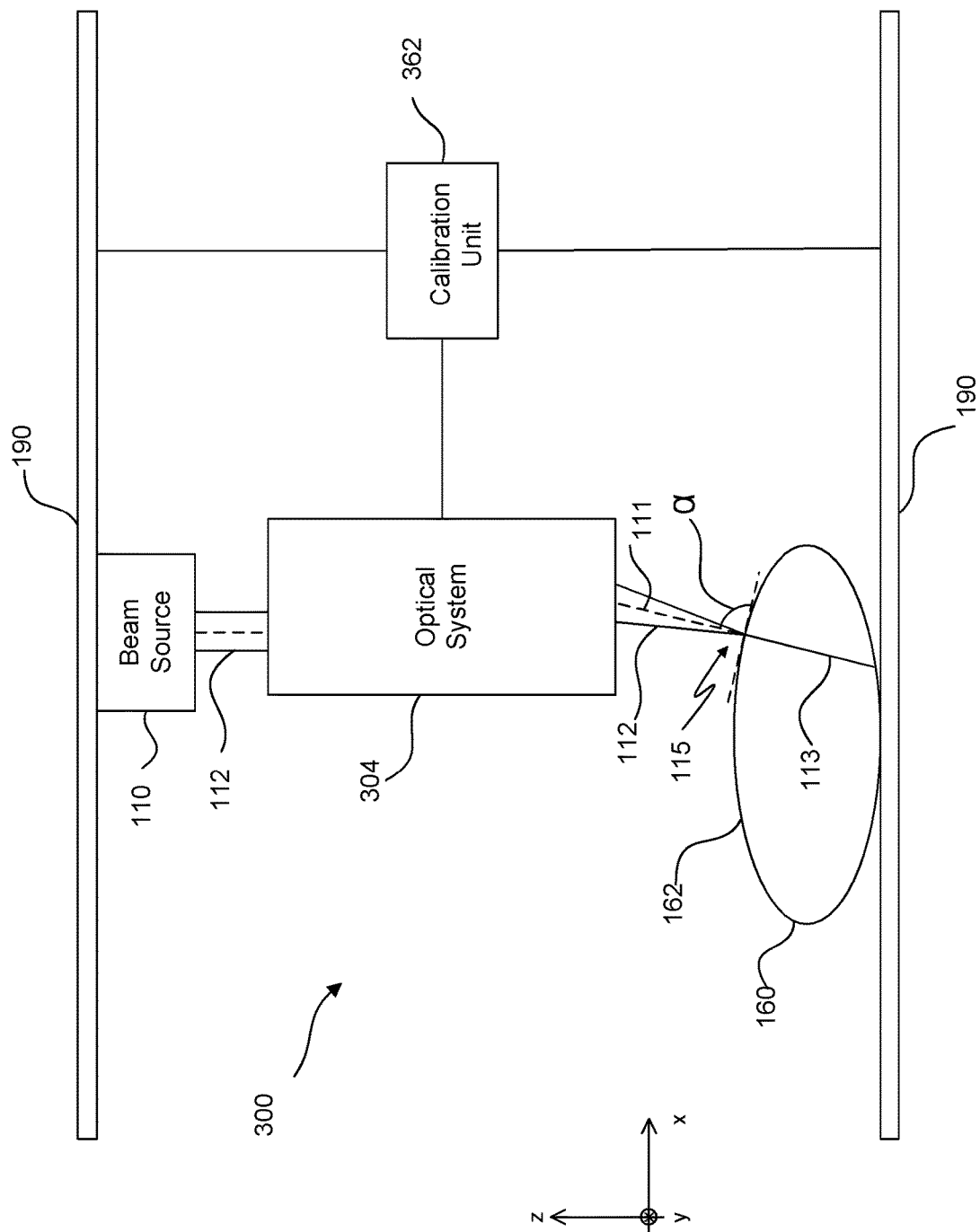
FIG. 3 illustrates a system for free-form laser processing of a transparent workpiece, according to an embodiment.

FIG. 3 shows a schematic illustration of a system 300 performing laser processing on transparent workpiece 160 according to some embodiments, wherein system 300 includes a light source (e.g., beam source 110) and an optical system 304.

In this example, beam source 110 produces laser beam 112 that passes through optical system 304 along beam pathway 111. Laser beam 112 can be a pulsed laser beam with pulse bursts having two sub-pulses per pulse burst or more, as described in FIG. 2. Laser beam 112 initially contacts transparent workpiece 160 at impingement location 115 on a impingement surface (e.g., first surface 162 as depicted in FIG. 3), and then focuses into laser beam focal line 113 inside transparent workpiece 160. In this example, system 300 is used to orient laser beam 112 such that laser beam focal line 113 can be orthogonal to first surface 162 at impingement location 115. System 300 is configured for laser processing of transparent workpiece 160 to form contour similar to contour 170 described in FIG. 1A. Transparent workpiece 160 can be the transparent workpiece described in FIG. 1A and can include an alkali aluminosilicate glass material.

In some embodiments, first surface 162 can be flat or uneven. In other embodiments, transparent workpiece 160 can have a three dimensional structure, as shown in FIG. 3. The transparent workpiece can be a small substrate, a large sheet of about 0.5 m×0.5 m, or the like.

In some embodiments, beam source 110 can be mounted with optical system 304. In other embodiments, beam source 110 can be positioned separately from optical system 304. In this example, laser beam 112 can be guided through a set of optical arrangements or fibers (not shown) into optical system 304.

Laser beam 112 at the output of optical system 304 includes quasi-non-diffracting beam described herein, which includes Bessel beam, Gauss-Bessel beam, Airy beam, Weber beam, and Mathieu beam, etc.

System 300 can further comprise one or more translating stages 190 and a calibration unit 362. In this example, one or more translating stages 190 can be configured to move transparent workpiece 160, beam source 110, optical system 304, or a combination of beam source 110 and optical system 304. Translation stages 190 can provide linear kinematic motions along X-, Y-, Z-directions, and can include slides, tracks, gantries, or any suitable positioning apparatus for optical systems. Accordingly, impingement location 115 can be adjusted through relative displacement between laser beam 112 and transparent workpiece 160. Laser beam 112 propagates along beam pathway 111, forming an angle α with impingement surface (e.g., first surface 162). Optical system 304 of the present disclosure can provide two rotational motions to adjust angle α to 90 degrees at impingement location 115.

Calibration unit 362, e.g., one or more cameras or image sensors, can be used to measure or calibrate the position and orientation of laser beam 112 through images of the contour on transparent workpiece 160. If needed, translation stages 190 can be used to adjust the location and height of transparent workpiece 160 with respect to optical system 304 based on the feedback from calibration unit 362. Orientation of laser beam 112 can be adjusted by optical system 304.

Figure 4:
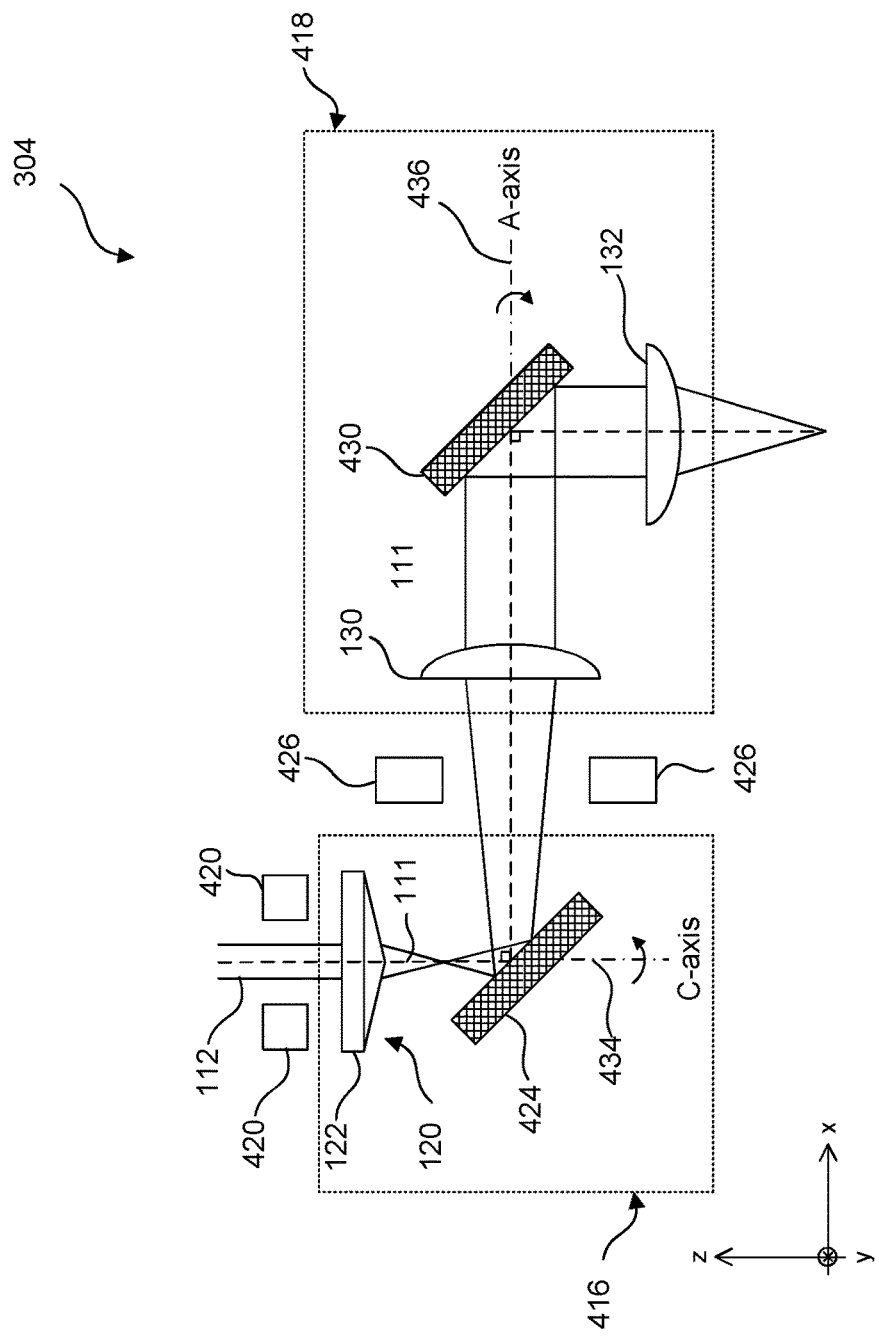
FIG. 4 illustrates an optical system for free-form laser processing, according to an embodiment.

FIG. 4 illustrates an exemplary configuration of optical system 304, wherein optical system 304 includes optical elements such as aspheric optical element 120, a first reflecting optical device 424, first lens 130, a second reflecting optical device 430, and second lens 132. Aspheric optical element 120 can be axicon 122, as depicted in FIG. 4. Aspheric optical element 120 can also include a refractive axicon, a reflective axicon, a negative axicon, a spatial light modulator, a diffractive optic, or a cubically shaped optical element. First and second reflecting optical devices 424 and 430 include mirrors. First lens 130 can be configured to collimate laser beam 112, and second lens 132 can be configured to focus laser beam 112.

In some embodiments, aspheric optical element 120 can transform an incident laser beam 112 (e.g., an incoming Gaussian beam) into a quasi-non-diffracting beam, wherein the Rayleigh range $Z_R$ of the quasi-non-diffracting beam can be determined using Equation (32), with the dimensionless divergence factor $F_D$ of 10 or greater. The dimensionless divergence factor $F_D$ can also have a value of from 10 to 2000, from 50 to 1500, or from 100 to 1000.

First and second lens can be used to modify the spot size and the laser beam focal line length at the output of optical system 304. During one exemplary operation, laser beam 112 is deflected inside optical system 304 at first and second reflecting optical devices 424 and 430. To minimize beam shape distortion, the deflection angle along beam pathway 111 or the optical axis can be maintained at 90 degrees.

In some embodiments, optical system 304 includes a first portion 416 and a second portion 418. First portion 416 includes aspheric optical element 120 and first reflecting optical device 424. Second portion 418 includes first lens 130, second reflecting optical device 430, and second lens 132.

In some embodiments, optical system 304 includes a first rotating device 420 (also referred to herein as "first torque motor") and a second rotating device 426 (also referred to herein as "second torque motor") integrated into respective ones of the first and second portions 416/418. First rotating device 420 and second rotating device 426 can be motors, for example, direct-drive motors. A direct-drive motor can transfer power directly to a moving structure without relying on any transmission gears. Without backlash or hysteresis of transmission gears, a direct-drive motor can provide higher speed, and more importantly, higher accuracy. A direct drive motor can include a torque motor that have a central hollow shaft for passing laser beams. Furthermore, a torque motor can include a computing system and a control system, for example, an encoder, for accurately positioning and tracking the rotation provided by the motor. Since there is no mechanical transmission between feedback device and the load in a torque motor, the position encoder can provide a high resolution for precise control.

In optical system 304, first rotating device 420 rotates first portion 416 around a first axis 434 and second rotating device 426 rotates second portion 418 around a second axis 436. In some embodiments, first axis 434 can be perpendicular to second axis 436. In this example, first axis 434 can be vertical Z-axis (or C-axis) and second axis 436 can be X- or Y-axis (or A-axis) in a Cartesian coordinate system.

In some embodiments, second portion 418 can rotate around first axis 434 together with first portion 416. In this example, the rotation around first axis 434 is primary and the rotation around second axis 436 is secondary.

In some embodiments, aspheric optical element 120 can be stationary and not necessarily rotate around first axis 434. In other embodiments, first lens 130 can rotate around first axis 434 and not necessarily rotate around second axis 436. Accordingly, in an embodiment, first portion 416 can include aspheric optical element 120, first reflecting optical device 424 and first lens 130, and second portion 418 can include second reflecting optical device 430 and second lens 132. In another embodiment, first portion 416 can include first reflecting optical device 424 and first lens 130, and second portion 418 can include second reflecting optical device 430 and second lens 132. In some embodiments, first portion 416 includes first reflecting optical device 424, and second portion 418 includes first lens 130, second reflecting optical device 430 and second lens 132.

Figure 5A:
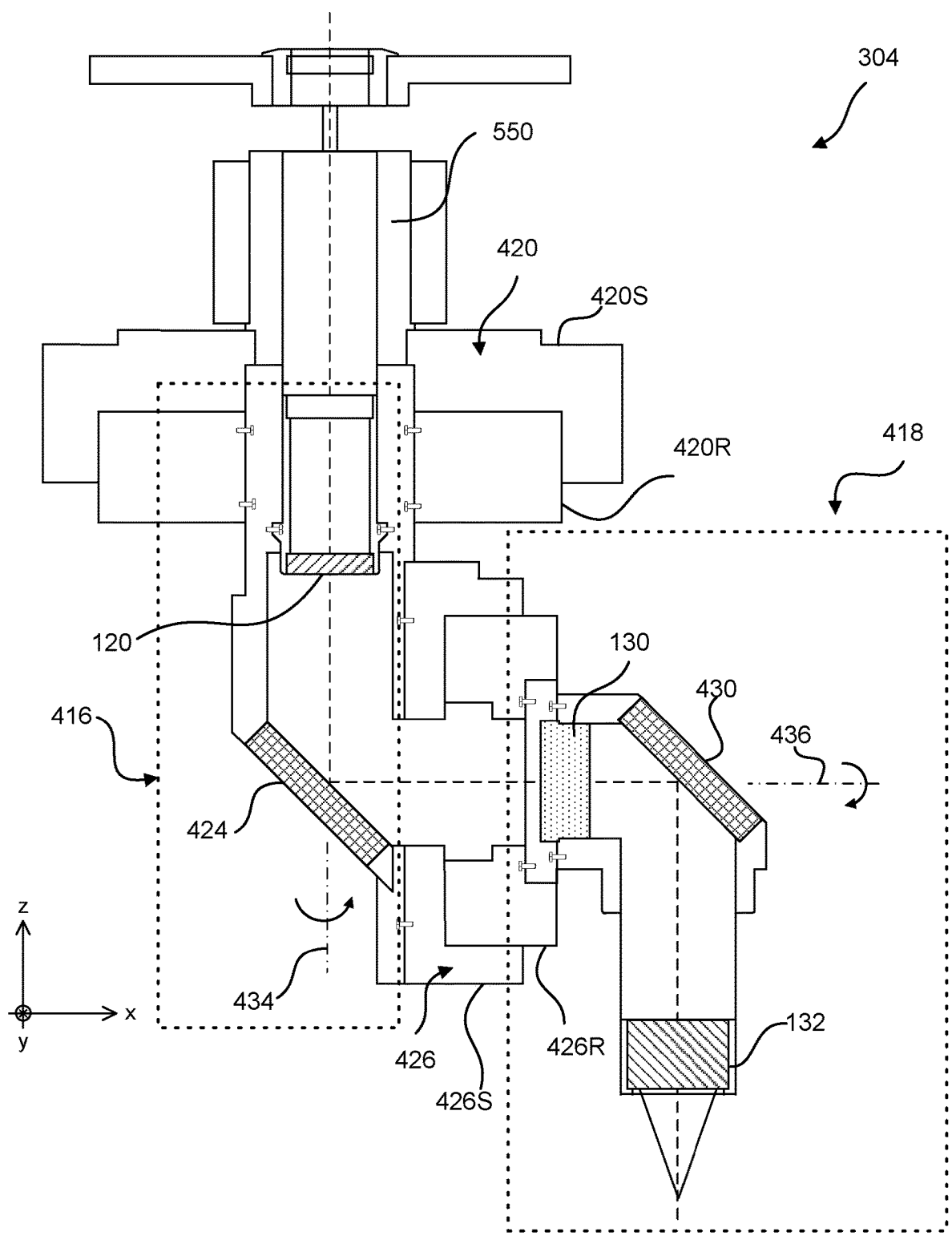
FIGS. 5A, 5B, 6, 7 and 8 illustrate various views of the optical system, according to embodiments.

FIG. 5A illustrates an exemplary design of optical system 304, according to an embodiment. Optical system 304 includes first portion 416 and second portion 418. Optical system 304 further includes first rotating device 420 and second rotating device 426. In this example, first portion 416 includes aspheric optical element 120 and first reflecting optical device 424. In this example, first rotating device 420 includes a torque motor. First torque motor 420 includes a stator 420S and a rotor 420R. Stator 420S can be stationary and rotor 420R can rotate. Aspheric optical element 120 and first reflecting optical device 424 can be attached to rotor 420R.

In some embodiments, first portion 416 further includes a slip ring 550 with a hollow shaft. Slip ring 550 can be used to deliver power and electrical signal to the moving structures of optical system 304. In this example, a laser beam (not shown) can pass through the hollow shaft of slip ring 550 and first torque motor 420, and illuminate onto aspheric optical element 120. The alignment of the illuminating beam with aspheric optical element 120 is critical in producing a quasi-non-diffracting beam.

In some embodiments, second portion 418 includes first lens 130, second reflecting optical device 430, and second lens 132. In this example, second rotating device 426 includes a torque motor. Second torque motor 426 includes a stator 426S and a rotor 426R. Stator 426S can be stationary and rotor 426R can rotate. As depicted in FIG. 5A, first lens 130, second reflecting optical device 430, and second lens 132 can be attached to rotor 426R. Stator 426S can be attached to rotor 420R of first portion 416 through, for example, metal tubing and/or couplings.

The alignment between aspheric optical element 120, first reflecting devices 424, first lens 130, second reflecting optical device 430, and second lens 132 is critical in producing the desired quasi-non-diffracting beam at the output of optical system 304. Accordingly, light deflection angles at first and second reflecting optical devices 424 and 430 can be kept at 90 degrees along optical axes.

In some embodiments, first rotating device 420 can rotate first portion 416 around first axis 434 and second rotating device 426 can rotate second portion 418 around second axis 436. First axis 434 can include C-axis in vertical Z-direction, and second axis 436 can include A-axis in either X- or Y-direction. In some embodiments, second portion 418 can also rotate around first axis 434 through a rigid connection between rotor 420R and stator 426S.

Figure 5B:
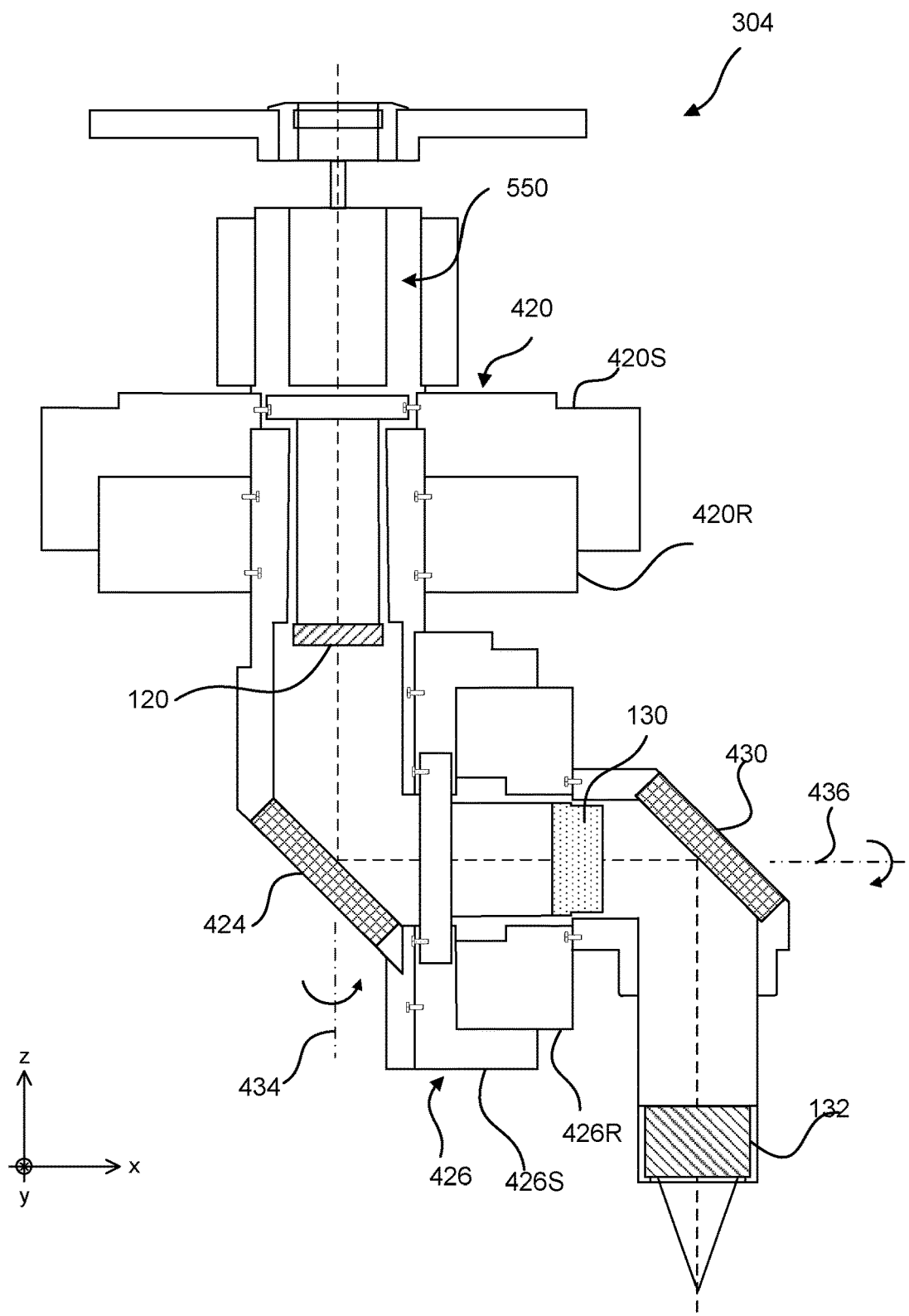

In some embodiments, as depicted in FIG. 5B, aspheric optical element 120 can be stationary and not necessarily rotate around first axis 434. In this example, aspherical optical element 120 can be attached to stator 420S. In some embodiments, first portion 416 can include first lens 130, wherein first lens 130 can rotate around first axis 434 and not necessarily rotate around second axis 436. In this example, first lens 130 can be attached to rotor 420R.

Figure 6:
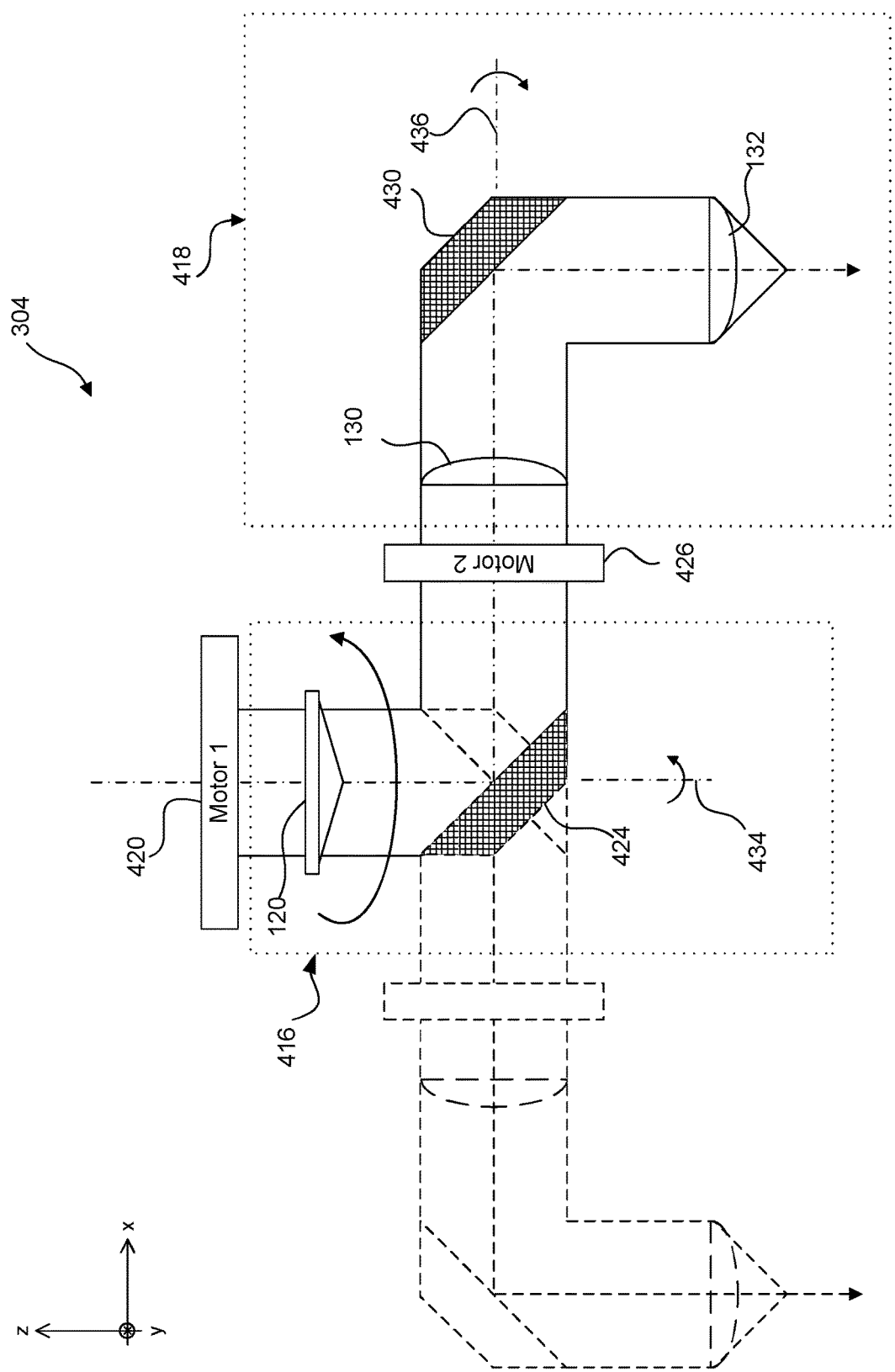

FIG. 6 illustrates an exemplary optical system 304 in first and second positions during operation, according to an embodiment. In this example, optical system 304 includes first portion 416 and second portion 418. First portion 416 includes aspheric optical element 120 and first reflecting optical device 424. Second portion 418 includes first lens 130, second reflecting optical device 430 and second lens 132. Optical system 304 further includes first rotating device 420 and second rotating device 426.

In this example, first portion 416 can rotate around first axis 434 and second portion 418 can rotate around second axis 436. In this example, first axis 434 can be vertical Z-axis and second axis 436 can be horizontal X- or Y-axis.

In some embodiments, second portion 418 can be attached to first portion 416, and also rotate around first axis 434 (as depicted in FIG. 6).

In this example, the dash lines in FIG. 6 illustrate the locations of the optical elements of optical system 304 after rotating 180 degrees around first axis 434, driven by first rotating device 420. As part of first portion 416, aspheric optical element 120 and first reflecting optical device 424 rotate 180 degrees around first axis 434. Second portion 418 also rotates 180 degrees around first axis 434, simultaneously with first portion 416, because it is attached to the rotating structure of first rotating device 420.

Figure 7:
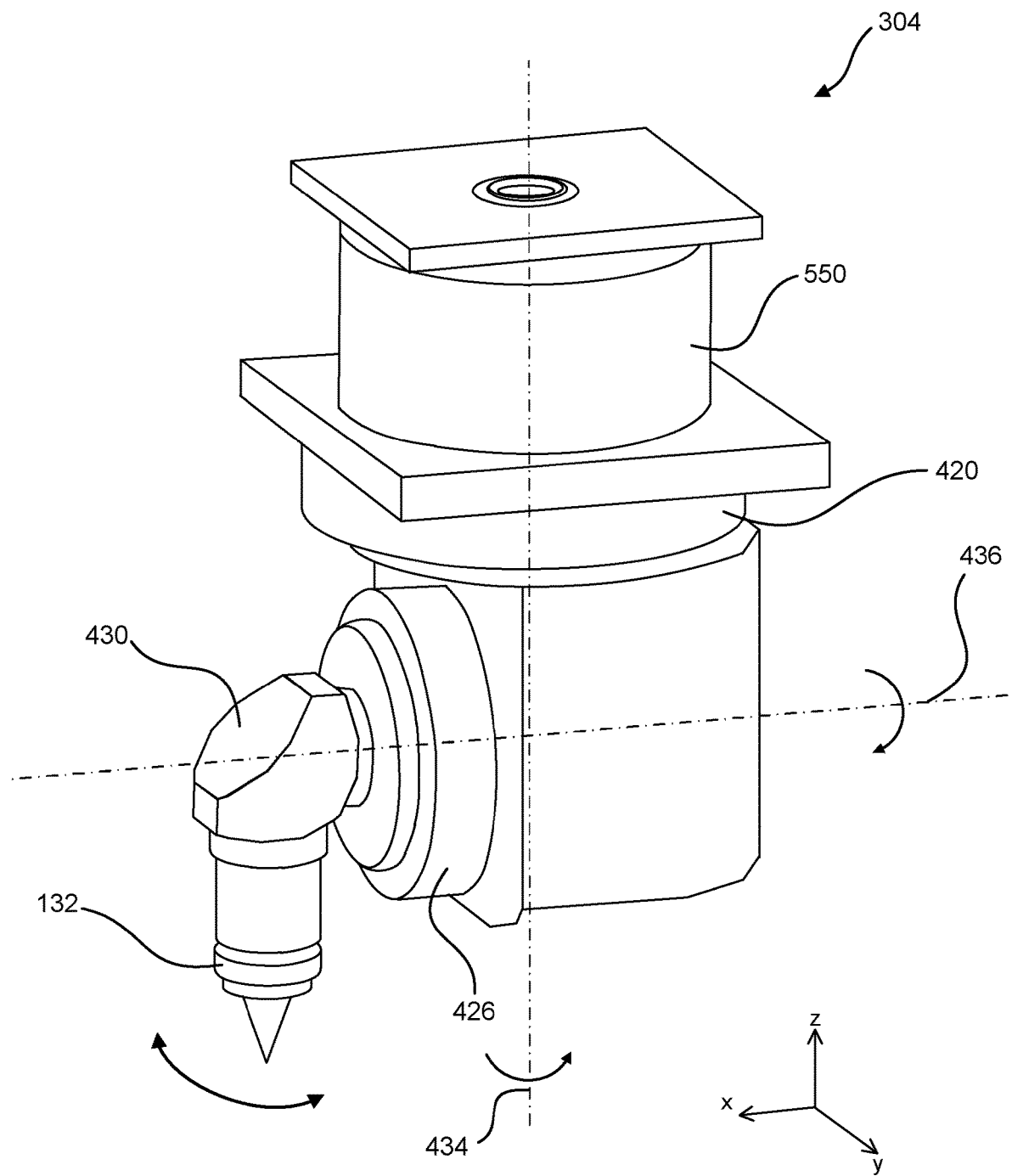
Figure 8:
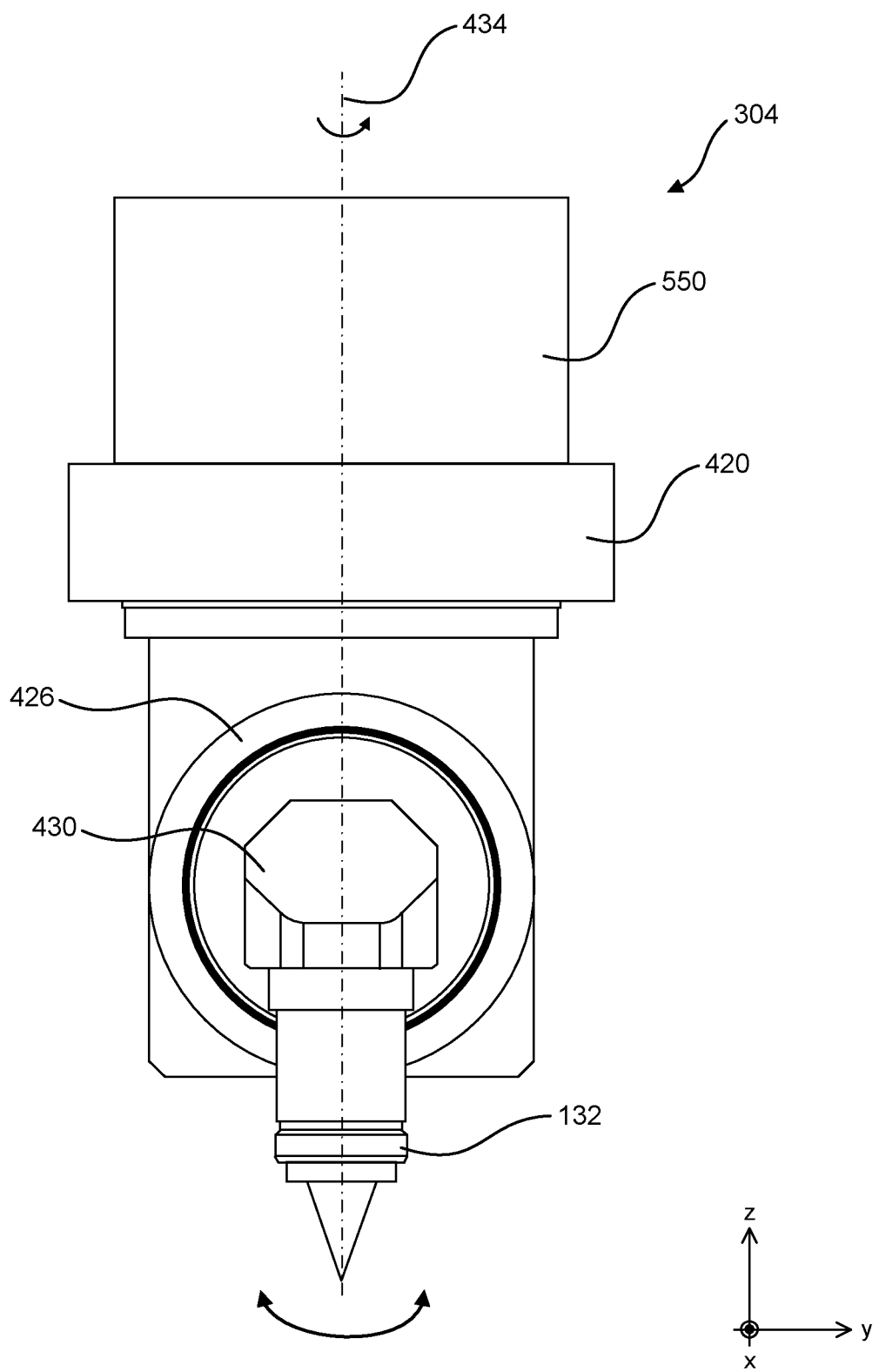

FIGS. 7 and 8 show perspective and front views of the rotation of second portion 418 around second axis 436, according to an embodiment.

In FIGS. 7 and 8, second rotating device 426, first lens 130 (not shown), second reflecting optical device 430 and second lens 132 can rotate around second axis 436. In some embodiments, second axis 436 can be an A-axis in X- or Y-direction.

In some embodiments, optical system 304 can include first rotating device 420. First rotating device 420 can rotate around first axis 434. In some embodiments, first axis 434 can be a C-axis in vertical Z-direction. In some embodiments, optical system 304 can further include slip ring 550.

Referring back to FIG. 1A and FIG. 3, a method for free-form laser processing of transparent workpiece 160 is illustrated, according to an embodiment. The method includes generating quasi-non-diffracting beam 112 using system 300, wherein system 300 includes light source 110 and optical system 304. The method also includes directing quasi-non-diffracting beam 112 onto transparent workpiece 160, generating an induced absorption and producing a defect within transparent workpiece 160. The method further includes moving quasi-non-diffracting beam 112 relative to transparent workpiece 160 along a contour line 165, forming a contour 170 with a plurality of defects 172 in transparent workpiece 160, wherein quasi-non-diffracting beam 112 is oriented orthogonal to impingement surface (e.g., first surface 162) of transparent workpiece 160 at impingement location 115.

Referring to FIG. 1A, FIG. 3 and FIG. 4, quasi-non-diffracting beam 112 can be adjusted to maintain a normal incidence at any given impingement location 115 through rotating devices 420 and 426 of optical system 304. To maintain quasi-non-diffracting beam shape and keep 90 degrees of deflection angles at reflecting optical devices 424/430, optical system 304 does not have three degrees of rotation, but two degrees of rotation. Achieving normal incidence at any given impingement location 115 includes a first step of rotating first rotating device 420 around first axis 434 (e.g., C-axis), so that the plane of incidence of quasi-non-diffracting beam 112 and transparent workpiece 160 can be perpendicular to second axis 436 (e.g., A-axis), or in the other words, parallel to the rotation plane around second axis 436. Achieving normal incidence at any given impingement location includes a second step of rotating second rotating device 426 so that quasi-non-diffracting beam 112 can be tilted within the plane of incidence and can be made perpendicular to first surface 162 at impingement location 115. For three-dimensional transparent work piece 160 with a curved impingement surface, an orthogonal orientation between quasi-non-diffraction beam 112 and impingement surface 162 can be maintained by system 300 as quasi-non-diffraction beam 112 moving along contour lines 165 to different locations on the curved surface of transparent workpiece 160 that have different surface orientations.

As described previously, system 300 used for free-form laser processing includes light source (or beam source 110), optical system 304 including first and second portions 416/418, and first and second torque motors 420/426 integrated with respective ones of first and second portions 416/418, wherein first torque motor 420 is configured to rotate first portion 416 around first axis 434, wherein second torque motor 426 is configured to rotate second portion 418 around second axis 436 and wherein first axis 434 is perpendicular to second axis 436. Optical system 304 includes aspheric optical element 120, first reflecting optical device 424, first lens 130 that configured to collimate the light, second reflecting optical device 430, and second lens 132 that configured to focus the light.

Figure 9:
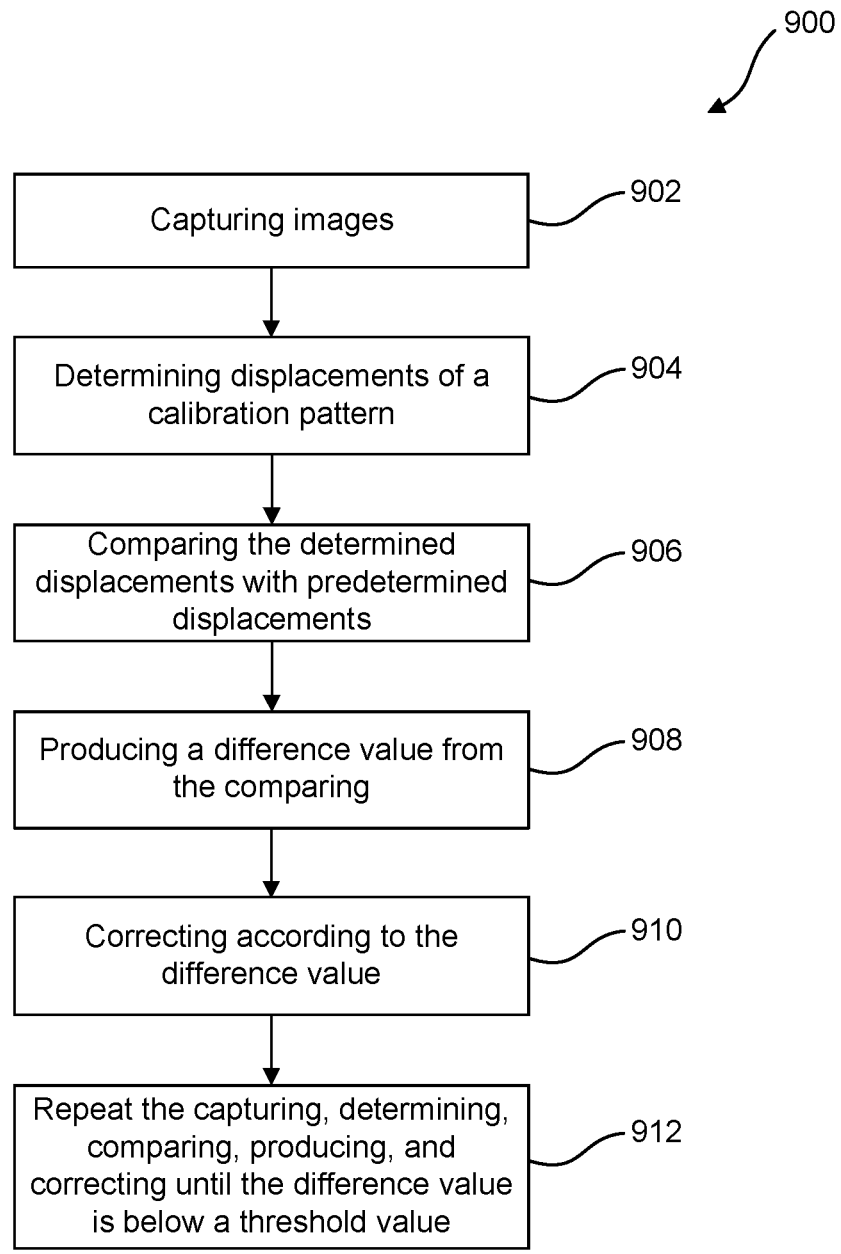
FIG. 9 illustrates a method for calibration of the optical system, according to embodiments.

FIG. 9 is a flowchart of an exemplary method 900 for measuring and calibrating positions and orientations of quasi-non-diffracting beam 112, according to an embodiment. Method 900 may describe the operation of system 300 as discussed above with reference to FIGS. 1A-8. It should be understood that the operations shown in method 900 are not exhaustive and that other operations can be performed as well before, after, or between any of the illustrated operations. In various embodiments of the present disclosure, the operations of method 900 can be performed in a different order and/or vary.

At step 902, images of contours (similar to contour 170 in FIG. 1A) of an object (e.g., transparent workpiece 160) can be captured by using calibration unit 362 (shown in FIG. 3). Calibration unit 362 can include any visual systems such as one or more cameras, image sensors, three-dimensional scanners, etc., Calibration unit 362 can also include three-dimensional coordinate measuring machines such as laser trackers.

At step 904, the motion of quasi-non-diffracting beam 112 can be determined from displacements of one or more calibration patterns in the captured images. Calibration patterns can be any point, line or corner features that have sharp contrast changes and/or can be extracted digitally.

At step 906, the determined displacements of one or more calibration patterns in the captured images can be compared with predetermined displacements.

At step 908, a difference value can be produced from the comparing of the determined and predetermined displacements of one or more calibration patterns in the captured images.

At step 910, the positions and orientations of quasi-non-diffracting beam 112 can be corrected according to the difference value.

At step 912, the capturing, determining, comparing, producing and correcting operations in the previous steps from 902-910 can be repeated until the difference value is below a threshold value, wherein the threshold include a value between 20 µm to 40 µm. The threshold value can be determined by the resolution of system 300.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A system comprising:
    a light source that produces a pulsed laser beam with pulse bursts comprising two sub-pulses per pulse burst or more;
    an optical system comprising first and second portions; and
    first and second torque motors integrated with respective ones of the first and second portions,
    wherein the first torque motor is configured to rotate the first portion around a first axis;
    wherein the second torque motor is configured to rotate the second portion around a second axis; and
    wherein the first axis is perpendicular to the second axis.

2. The system of claim 1, wherein the optical system comprises:
    an aspheric optical element;
    a first reflecting optical device;
    a first lens, configured to collimate the light;
    a second reflecting optical device; and
    a second lens, configured to focus the light.

3. The system of claim 1, wherein the optical system further comprises an aspheric optical element comprising a refractive axicon, a reflective axicon, a negative axicon, a spatial light modulator, a diffractive optic, or a cubically shaped optical element.

4. The system of claim 1, wherein the optical system comprises first and second reflecting optical devices comprising mirrors.

5. The system of claim 1, wherein the first portion comprises an aspheric optical element and a reflecting optical device.

6. The system of claim 5, wherein the first portion further comprises a lens.

7. The system of claim 1, wherein the first portion comprises a reflecting optical device and a lens.

8. The system of claim 1, wherein the second portion comprises a reflecting optical device and a lens.

9. The system of claim 8, wherein the second portion further comprises another lens.

10. The system of claim 1, wherein the optical system is configured to generate a quasi-non-diffracting beam.

11. The system of claim 10, wherein the quasi-non-diffracting beam comprises:
    a wavelength $\lambda$;
    a spot size $w_o$; and
    a cross section that comprises a Rayleigh range $Z_R$ that is greater than $$F_D \frac{\pi w_0^2}{\lambda},$$

where $F_D$ is a dimensionless divergence factor comprising a value of 10 or greater.

12. The system of claim 11 wherein the dimensionless divergence factor $F_D$ comprises a value of from 10 to 2000.

13. The system of claim 11, wherein the dimensionless divergence factor comprises a value of from 50 to 1500.

14. The system of claim 11, wherein the dimensionless divergence factor $E_D$ comprises a value of from 100 to 1000.

15. The system of claim 1, further comprising an encoder configured to track the torque motor.

16. The system of claim 1, wherein the first axis is vertical Z axis and the second axis is X or Y axis in a Cartesian coordinate system.

17. The system of claim 1, wherein the system is configured for laser processing a transparent workpiece.

18. The system of claim 17, wherein the transparent workpiece comprises an alkali aluminosilicate glass material.

19. A method comprising:
generating, by a system, a quasi-non-diffracting beam;
directing the quasi-non-diffracting beam onto a transparent workpiece, generating an induced absorption and producing a defect within the transparent workpiece; and
moving, by the system, the quasi-non-diffracting beam relative to the transparent workpiece along a contour line, forming a contour with a plurality of defects in the transparent workpiece,
wherein the quasi-non-diffracting beam is oriented orthogonal to an impingement surface of the transparent workpiece at an impingement location, and
wherein an orthogonal orientation between the quasi-non-diffracting beam and the impingement surface is maintained as the quasi-non-diffracting beam moves along the contour line to different locations on the curved surface of the transparent workpiece that have different surface orientations.

20. The method of claim 19, wherein the impingement surface of the transparent workpiece is a curved surface.

21. The method of claim 19, wherein the system comprises:
a light source;
an optical system comprising first and second portions; and
first and second torque motors integrated with respective ones of the first and second portions,
wherein the first torque motor is configured to rotate the first portion around a first axis;
wherein the second torque motor is configured to rotate the second portion around a second axis; and
wherein the first axis is perpendicular to the second axis.

22. The method of claim 21, wherein the optical system comprises:
an aspheric optical element;
a first reflecting optical device;
a first lens, configured to collimate the light;
a second reflecting optical device; and
a second lens, configured to focus the light.

23. A system comprising:
a light source;
an optical system comprising first and second portions; and
first and second torque motors integrated with respective ones of the first and second portions,
wherein the first torque motor is configured to rotate the first portion around a first axis;
wherein the second torque motor is configured to rotate the second portion around a second axis; and
wherein the first axis is perpendicular to the second axis, the first axis is vertical Z axis, and the second axis is X or Y axis in a Cartesian coordinate system.

* * * * *

UNITED STATES PATENT AND TRADEMARK OFFICE
CERTIFICATE OF CORRECTION

PATENT NO. : 11,633,805 B2
APPLICATION NO. : 16/583733
DATED : April 25, 2023
INVENTOR(S) : Heiko Kiessling et al.

It is certified that error appears in the above-identified patent and that said Letters Patent is hereby corrected as shown below:

On the Title Page

In item (57), in Column 2, in "Abstract", Line 5, delete "portions," and insert -- portions. --.

In the Claims

In Column 28, Line 55, in Claim 13, after "factor" insert -- $F_D$ --.

In Column 28, Line 57, in Claim 14, delete "$E_D$" and insert -- $F_D$ --.

Signed and Sealed this
Twelfth Day of September, 2023

*Katherine Kelly Vidal*

Katherine Kelly Vidal
*Director of the United States Patent and Trademark Office*